United States Patent [19]

Lom

[11] Patent Number: 4,900,128
[45] Date of Patent: Feb. 13, 1990

[54] THREE DIMENSIONAL BINOCULAR CORRELATOR

[75] Inventor: Kwok-kelm Lom, Bethpage, N.Y.
[73] Assignee: Grumman Aerospace Corporation, Bethpage, N.Y.
[21] Appl. No.: 265,521
[22] Filed: Nov. 1, 1988
[51] Int. Cl.[4] .................... G02B 27/46; G06K 9/28
[52] U.S. Cl. ........................ 350/162.13; 350/3.68; 350/3.77
[58] Field of Search ............. 350/162.12, 162.13, 350/162.14, 516; 356/390, 398; 378/23

[56] References Cited

U.S. PATENT DOCUMENTS 4,118,099  10/1978  Weiss et al. ............. 350/3.73

Primary Examiner—Bruce Y. Arnold
Attorney, Agent, or Firm—Scully, Scott, Murphy & Presser

[57] ABSTRACT

A three dimensional binocular correlator is disclosed in which additive/differential discrimination can be provided by combining and comparing two optical inputs of different aspect angular views of a target of interest onto one matched filter. This technical approach records more information on a dual exposure matched filter which denotes two different aspect angular views of the same target, to allow better and more effective target discrimination, and also provides three dimensional information on the target. The binocular correlator can differentially monitor the signal strength of the signal outputs from the two transforms, which can provide a feedback signal for such control measures as a course correction or for robotic control. The signal strengths of the transforms can be compared, for the same output levels, to confirm that they recognize the same target, and the dual outputs thereof can increase the combined correlation signal strength by 3 db. A tri-state logic approach could also be utilized to provide discrimination under multitarget scenarios for improved performance.

5 Claims, 4 Drawing Sheets

THREE DIMENSIONAL BINOCULAR CORRELATOR

BACKGROUND OF THE INVENTION

1. Field of the Invention

The present invention relates generally to the field of optical correlators which compare input image information with image information stored in one or more matched filters, and more particularly the subject invention pertains to a three dimensional binocular correlator in which inputs provide additive/differential discrimination by combining and comparing two optical inputs of different aspect angular views of a target of interest onto one matched filter.

2. Discussion of the Prior Art

A traditional optical correlation system utilizes matched filters to provide object identification, and possibly to provide aspect information, such as positional and size information, about an object, and utilizes primarily parallel optical processing therein. In a typical prior art optical correlator, an input image is incident upon a spatial light modulator, and the input image spatially modulates a coherent beam of radiation. A multiple holographic lens has the spatially modulated radiation beam incident thereon, and performs a multiple number of Fourier transformations thereon to obtain an array of a multiple set of Fourier transforms of the spatially modulated radiation beam. A corresponding array of matched filters has the array of Fourier transforms incident thereon, with each matched filter comprising a Fourier transform hologram of an aspect view of an object of interest, and each matched filter passes an optical correlation signal in dependence upon the degree of correlation of the Fourier transform of the spatially modulated radiation beam with the Fourier transform recorded by the matched filter. An inverse Fourier transform lens receives the optical correlation outputs of the array of matched filters, and performs an inverse Fourier transformation on each optical correlation output. A detector then detects the inverse Fourier transform of each optical correlation output, and produces a detector output signal representative of each optical correlation output.

Traditional optical correlators process and provide only two dimensional information on a target of interest in one or more matched filters which comprise the optical memory of such correlators.

SUMMARY OF THE INVENTION

Accordingly, it is a primary object of the present invention to provide a three dimensional binocular correlator in which additive/differential discrimination can be provided by combining and comparing two optical inputs of different aspect angular views of a target of interest onto one matched filter. This technical approach records more information on a dual exposure matched filter which denotes two different aspect angular views of the same target, to allow better and more effective target discrimination, and also provides three dimensional information on the target.

Infra-red as well as visual inputs are sometimes susceptible to countermeasures, such as by the use of screening by smoke or flares. Under such hostile countermeasures conditions, signal to noise ratios frequently decrease. However, the additive inputs of the present invention may provide a sufficient signal in relation to background noise to see through these attempted countermeasures. The subject invention differentially monitors the signal strength of the signal outputs from two transforms, in a three dimensional binocular correlator which can provide a feedback signal for such control measures as a course correction or for robotic control. The signal strengths of the transforms can be compared, for the same output levels, to confirm that they recognize the same target, and the dual outputs thereof can increase the combined correlation signal strength by 3 db. A tri-state logic approach could also be utilized to provide discrimination under multitarget scenarios for improved performance. Moreover, in the case of an input failure, the dual signal inputs provide redundancy for increased reliability. Also, when both inputs are functioning, a wider search area for a target is provided.

In accordance with the teachings herein, the present invention provides a three dimensional binocular optical correlator in which left and right angular aspect views of a target of interest are recorded simultaneously on a single matched filter to allow better and more effective target discrimination and also to provide three dimensional information on the target. The three dimensional binocular correlator includes left and right imaging optical systems for providing left and right images of left and right fields of view of a target area, with an overlapping target area therebetween. Left and right spatial light modulators are positioned substantially in the focal planes of the left and right optical systems for superimposing the left and right fields of view onto reference optical beams. Left and right optical transform systems provide left and right optical transforms of the left and right fields of view superimposed onto the reference beams in a common transform plane, and the dual exposure matched filter is positioned in the common transform plane. Left and right transform correlation detectors are provided for detecting the left and right correlation outputs of the dual exposure matched filter. The signal strengths of the two transform detectors are monitored differentially, as by a differential amplifier, to provide a control signal for control purposes such as a course correction or for robotic controls. Moreover, a correlation spot detector is also provided for detecting a common A+B correlation spot formed by the dual exposure matched filter.

The present invention also provides an arrangement for fabricating a dual exposure matched filter by recording thereon left and right Fourier transform holograms of left and right angular views of a target. The arrangement includes left and right imaging optical systems for providing left and right images of left and right fields of view of a target with an overlapping target area therebetween. Left and right spatial light modulators are positioned substantially in the focal planes of the left and right optical systems for superimposing the left and right fields of view onto reference optical beams. Left and right optical transform systems provide left and right optical transforms of the left and right fields of view superimposed on the reference beams in a common transform plane. A photomedium for forming the dual exposure matched filter is positioned in the common transform plane of the left and right transform optical systems. The photomedium is also simultaneously illuminated with a reference optical beam to form and record thereon the left and right Fourier transform holograms of the left and right angular views of the target.

BRIEF DESCRIPTION OF THE DRAWINGS

The foregoing objects and advantages of the present invention for a three dimensional binocular correlator may be more readily understood by one skilled in the art with reference being had to the following detailed description of a preferred embodiment thereof, taken in conjunction with the accompanying drawings wherein like elements are designated by identical reference numerals throughout the several views, and in which.

DETAILED DESCRIPTION OF THE DRAWINGS

Figure 1:
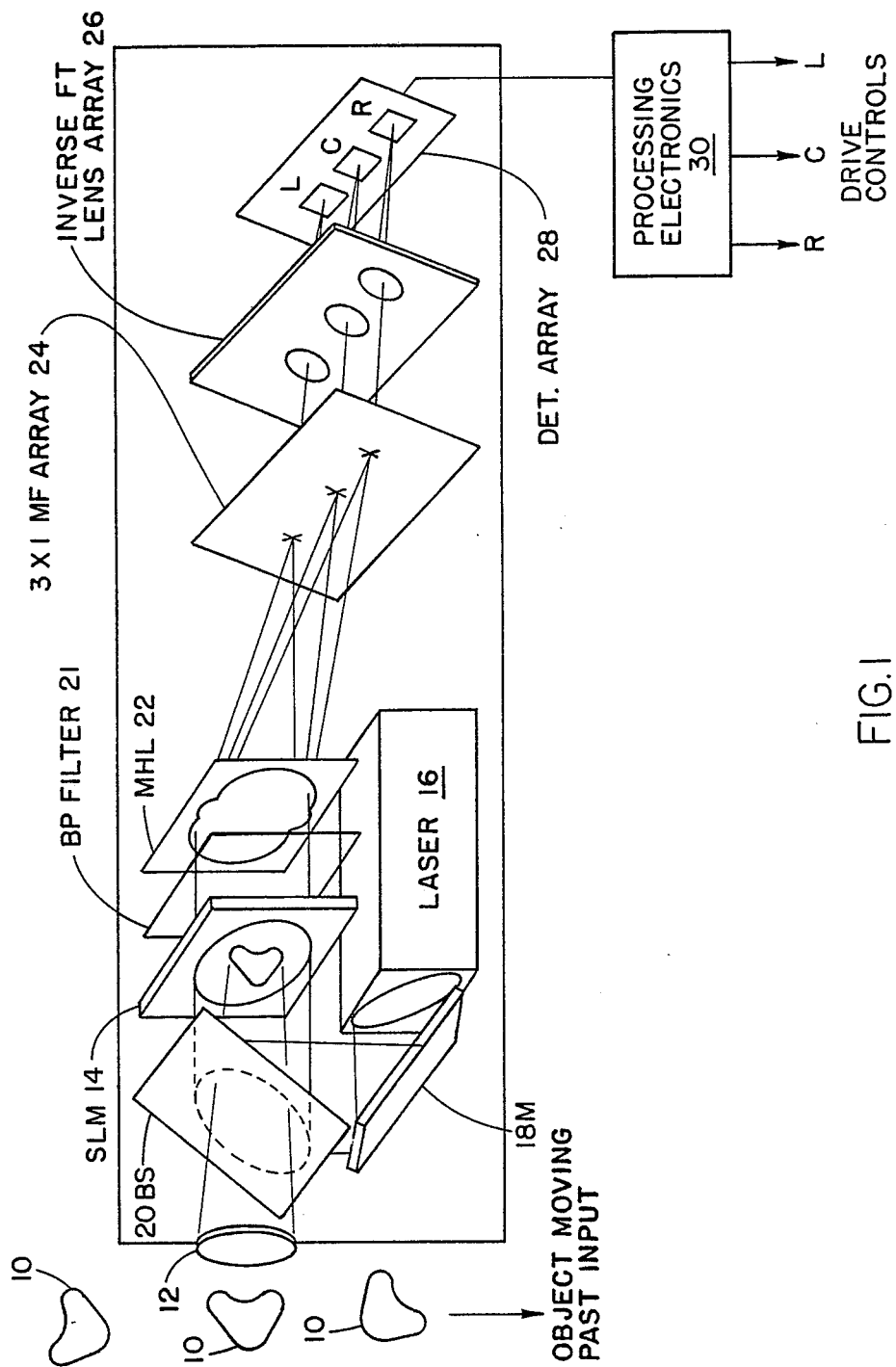
FIG. 1 illustrates a typical prior art optical correlator employing a multiple matched filter array as its memory.

A number of elements and concepts relating to the present invention are used in this description and are essential to an understanding of the function and general principles of operation of the invention, and accordingly the nature and properties of several of those concepts are discussed initially herein below for convenience.

When a lens is illuminated by a spatially modulated collimated beam (as when it is modified spatially by passing through a film of a scene, target, etc.), the lens creates at its focal plane the Fourier Transform of the object(s) on the film, which is a basic lens property. When the Fourier Transform is interfered with a collimated (or reference) beam from the same source, an interference pattern results. This is called a Fourier Transform hologram, or Matched Filter (MF). It is an optical spatial filter of the input object. When an arbitrary scene is played through the system, the matched filter will pick out and pass the object for which it was made. The signal passed by the filter is Fourier transformed again and a "correlation" plane results. If the matched filter target is present, a sharp correlation signal results, whereas non-target signals result in broad, low correlation signals in the correlation plane.

A matched filter is a Fourier transform (FT) hologram with properties that are sensitive to an input object's size, angular aspect and input location. These parameters can be predetermined in order to prescribe a set of angle and range (size) lines covering the anticipated object's aspects. In the fabrication of a matched filter, the holographic fringe visibility is optimized at a particular spatial frequency that will satisfy the size and/or aspect sensitivity requirements. Because it is unlikely that both requirements can be satisfied simultaneously, a plurality of independent MFs are frequently utilized in such an optical correlator. The nature of different particular applications will generally require significantly different MF sensitivities. In summary, a matched filter is a complex holographic structure having size, wavelength, thickness of the storage medium, focal length of the Fourier transform lens, contrast ratio, overlap, placement, and spatial frequency dependence, all of which must be considered in the fabrication of a matched filter.

A holographic lens (HL) is made by recording the interference pattern of an expanding point radiation source and a collimated radiation beam, which produces a hologram of a point source. When the holographic lens (after recording and processing, as on film) is illuminated, it recreates the point source, i.e., it behaves as a lens. If the recording process is initially repeated, a series of point source holograms, or a multiple holographic lens (MHL), can be recorded on the film. A multiple holographic lens array produces an array of Fourier Transforms of an input spatially modulated, laser radiation beam. In general, the particular requirements of the array are determined by the particular problem being addressed. In summary, a holographic lens takes a Fourier Transform (FT) of a laser beam illuminated scene or target, and a multiple holographic lens takes, simultaneously, a multiple set of Fourier Transforms. A multiple holographic lens array is usually used in conjunction with a corresponding multiple array of matched filters.

Referring to the drawings in detail, FIG. 1 illustrates a relatively simple embodiment of an optical correlator employing a memory bank of matched filters. An object of interest 10 is moving past the input to the optical correlator, and is imaged by an input lens 12 onto a spatial light modulator (SLM) 14, which spatially modulates the image onto a laser beam from a laser 16, directed thereto by a mirror 18 and beam splitter 20. The spatially modulated laser beam is initially passed through a bandpass (BP) filter 21 to allow only the image carried by the laser beam to pass therethrough. The spatially modulated laser beam is then Fourier transformed by a multiple holographic lens 22 and directed onto a corresponding array of matched filters (MFs) 24. An inverse Fourier Transform lens array 26 inversely Fourier transforms the output of the MFs and directs the outputs thereof onto a detector array 28, the output signals of which are electronically processed at 30 to produce output control signals.

Figure 2:
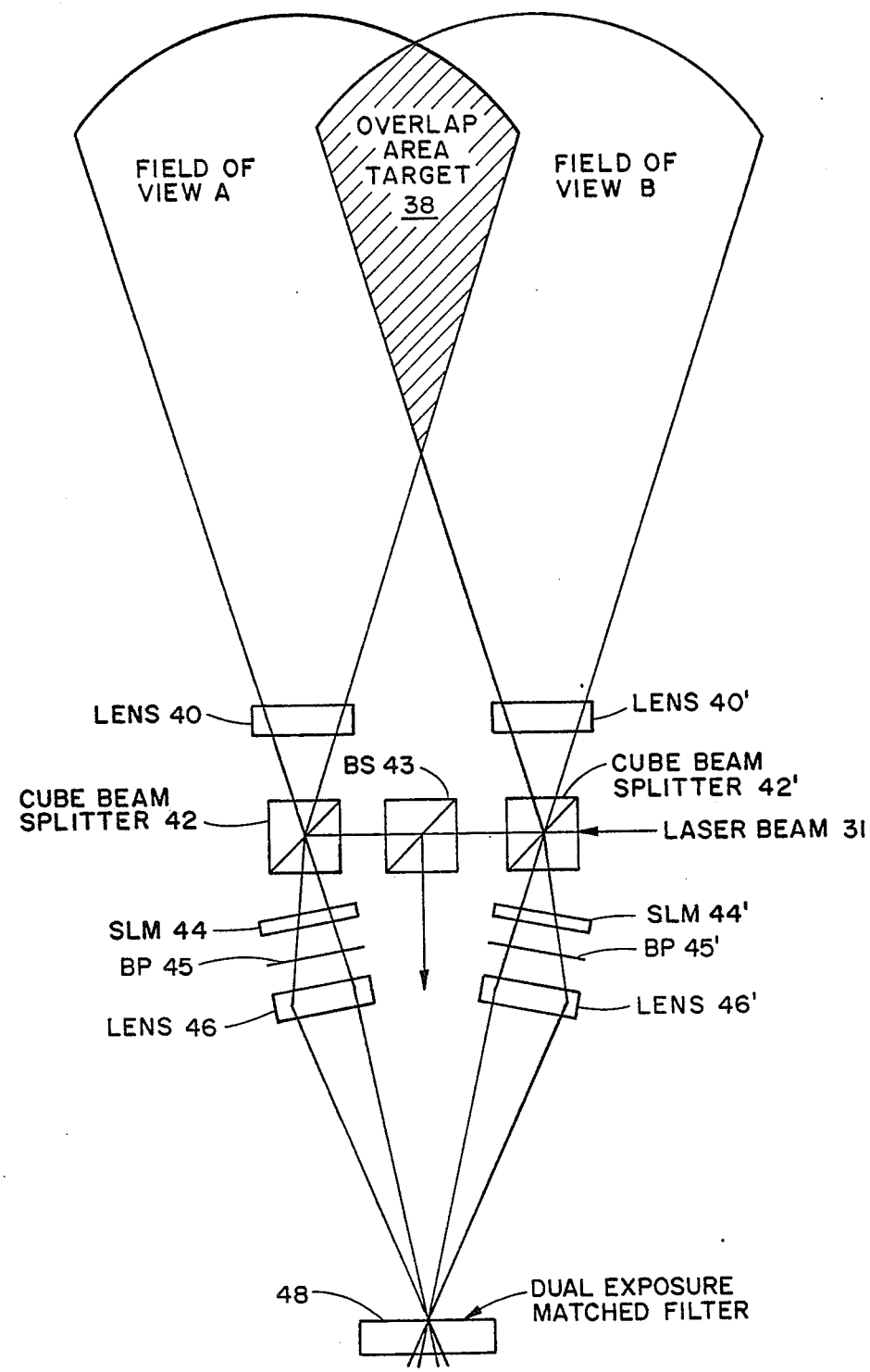
FIG. 2 is a schematic arrangement of an exemplary embodiment pursuant to the teachings of the present invention for fabricating a dual exposure matched filter simultaneously for a three dimensional binocular correlator as disclosed and taught herein.

FIG. 2 is a schematic arrangement of an exemplary embodiment pursuant to the teachings of the present invention for fabricating a dual exposure matched filter simultaneously and coherently for a three dimensional binocular correlator as disclosed and taught herein. Referring thereto, a laser beam 31 is directed through three consecutive beam splitters 42', 43, and 42 to form respectively a laser beam input to a spatial light modulator 44', a reference laser beam illuminating a dual exposure matched filter photoplate 48, and a laser beam input to the spatial light modulator 44. The laser beam inputs to the spatial light modulator 44' and 44 should be equal in intensity, and the beam splitters 42', 43, and 42 can be so designed to apportion the laser beam into appropriate intensity beams. Of course, other optical arrangements could also be utilized to divide the laser beam into three laser beam inputs as shown. The target area is divided into a field of view A on the left and a field of view B on the right, with a common overlap target area 38 therebetween.

The field of view A is imaged by a lens 40 through the cube beam splitter 42 onto a Spatial Light Modulator 44 where it is superimposed on the reference laser beam, which is then filtered by a BP filter 45 to allow only the spatially modulated laser beam to be imaged by lens 46 onto a photomedium 48. The photomedium 48 is also illuminated with the reference beam provided by beamsplitter 43 to form a Fourier Transform hologram or matched filter of the field of view A on the photomedium. The field of view B is simultaneously processed in the same manner by a lens 40', a beam splitter 42', a Spatial Light Modulator 44', a BP filter 45', and a lens 46' to form a simultaneous matched filter of the field of view B on the photomedium 48.

Accordingly, the arrangement of FIG. 2 fabricates a dual exposure matched filter which denotes two aspect angular views of the target, to allow better and more effective target discrimination, and also to provide three dimensional information on the target. Infra-red, as well as visual inputs are susceptible to countermeasures, such as by the use of screens provided by smoke or flares. Under such hostile countermeasures conditions, signal to noise ratios would frequently decrease. However, the additive outputs from the left and right views A and B may provide a sufficient signal in relation to background noise to boost the additive signal strength by 3 db to see through such countermeasures.

Figure 3:
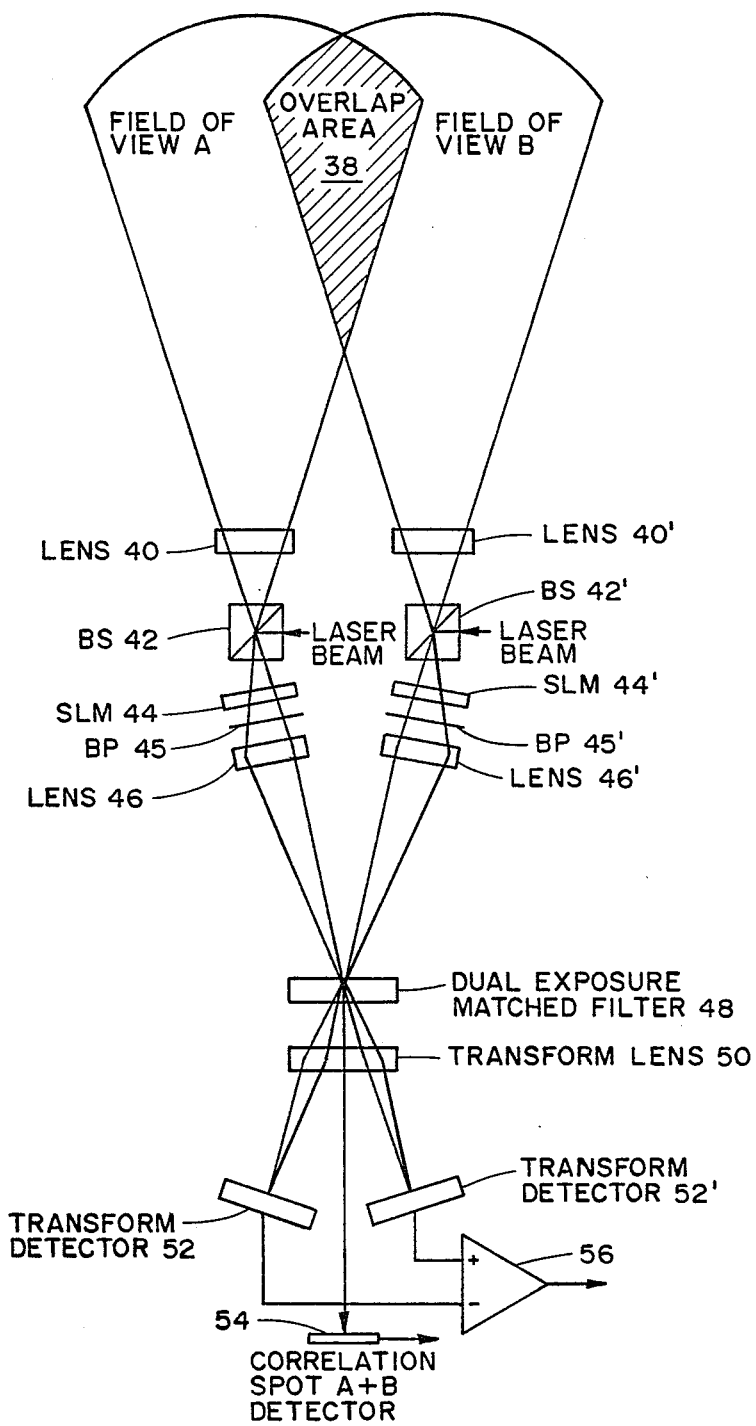
FIG. 3 illustrates a three dimensional optical correlator for processing an input image of interest with a dual exposure matched filter such as is produced by the arrangement of FIG. 2.

FIG. 3 illustrates a three dimensional optical correlator for processing input images of interest through a dual exposure matched filter such as is produced by the arrangement of FIG. 2. Referring thereto, an arrangement similar to that of FIG. 2 is used as a three dimensional correlator in which reference laser beams are directed into the beam splitters 42, 42', to allow the fields of view A, B to be superimposed thereon in the Spatial Light Modulators 44, 44', which are then passed by bandpass filters 45, 45' to be imaged by lenses 46, 46' onto the dual exposure matched filter which was developed after the processing of FIG. 2. The output thereof is then imaged by a Transform lens or lenses 50 in Fourier Transform planes where they are detected by respective detectors 52, 52', and then processed. An additional output is formed at a correlation spot A+B, which is also detected by a correlation spot A+B detector 54. This correlation spot signal A+B represents the combined zero order correlation spots of both channels A and B, and generally should be maximized during usage of the system, along with maximizing the separate output signals from detectors 52 and 52'.

A differential amplifier circuit 56 can differentially monitor the signal strengths of the two transforms as detected by 52 and 52', to provide a signal for such measures as a course correction or robotic controls. When the correlator arrangement of FIG. 3 views a target head on, as recorded by the arrangement of FIG. 2, the outputs form the Transform plane detectors 52, 52' should be equal. A stronger amplitude signal from detector 52, for example, indicates that the optical correlator should be rotated clockwise to equalize the detector outputs. Accordingly, in a target guidance system, appropriate steering controls can steer the system towards the target. In a robotic control system, appropriate robotic control signals can be developed. The signal strengths of the transforms are compared for the same output levels, to confirm that they recognize the same target, and the combined dual outputs can increase the correlation signal by 3 db over that over that provided by a traditional single matched filter correlator.

Figure 4:
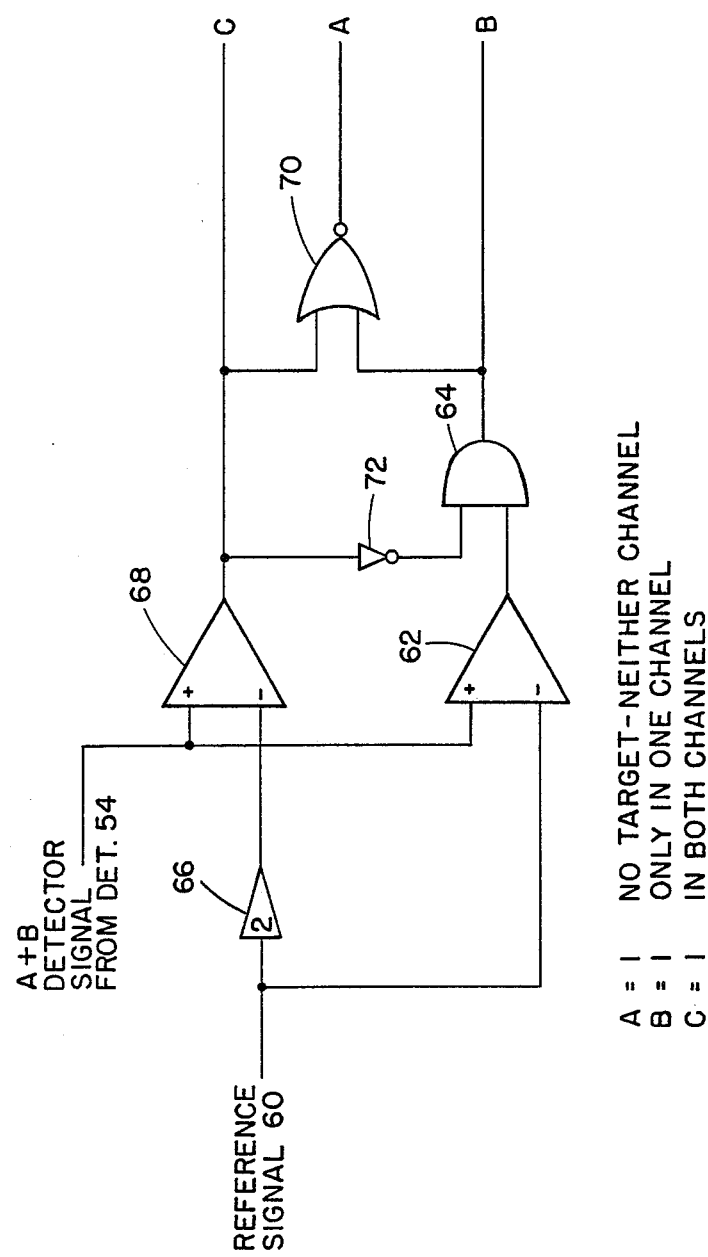
FIG. 4 illustrates a logic circuit working with the A and B correlation spot detector signal from FIG. 3 to determine whether the strength of that signal indicates that a target is being detected in one channel, both channels, or neither channel.

FIG. 4 illustrates a tri-state logic circuit for determining whether the A+B detector signal output from the correlation detector 54 indicates that a target is detected in one channel, both channels, or in neither channel. A reference signal 60 is representative of and monitors the incident or ambient light conditions in the search area, and provides a reference automatic gain control signal at 60. If the A+B detector signal is less than the reference signal 60, differential amplifier 62 produces a negative output, causing AND gate 64 to produce a negative output. The reference signal 60 is amplified by a factor of 2 in amplifier 66, and the A+B detector signal is also less than twice the output of amplifier 66, causing differential amplifier 68 to produce a negative output also. The two negative outputs on output lines A+B cause NOR gate 70 to produce a positive one output, representing that the very low amplitude of the A+B detector signal indicates that a target is being detected in neither channel. If the amplitude of the A and B detector signal is greater than the amplitude of the reference signal 60, but less than twice the amplitude of the reference signal 60 (output of amplifier 66), then the differential amplifier 62 produces a positive one output, and the differential amplifier 68 produces a negative output, which is inverted at 72, such that the AND gate 64 now produces a positive signal, which indicates that the target is being detected in only one channel. If the amplitude of the A+B detector signal is greater than twice the amplitude of the reference signal 60 (produced by amplifier 66), then differential amplifier 68 produces a positive one output, which is inverted by 72, such that AND gate 64 produces a negative output. The positive output on channel C causes A to go low, and the positive output on channel C indicates that the relatively strong A+B detector signal is caused by detecting the target in both channels.

Under a three target scenario in which a target occupies each field of view A, B, and a third target occupies the overlap area 38, additive targets would produce strong outputs from detectors 52, 52' and 54. As the distance between the optical correlator and the targets diminishes, the two targets that occupy the fields of view A and B would fall outside of the field of view of their prospective channels progressively, leaving only the target occupying the overlap area 38 as the singular target. A crossover condition occurs in which the signals of the targets that occupied field of views A and B diminishes as the signal from the target that occupies the overlap area increases. As the distance between the target and the correlator decreases even more, after this crossover condition, more of the target occupies more of the field of view, giving increasing output signals. Appropriate logic can be utilized to detect these conditions.

A tri-state logic approach could provide discrimination under multi-target scenarios for improved performance. A tri-state logic approach would compare each of the signals from the detectors 52, 52', and 54. The signals from detectors 52 and 52' would be compared and used for control purposes as described hereinabove, while the signal from correlation spot A+B detector 54 should be maximized, while maintaining and maximizing equal strength signals from detectors 52 and 52', to provide for maximum signal strengths from the optical correlator. One advantage of the detector 54 is that its signal strength can be evaluated without any time delay, as might be caused by a comparator circuit for the signals from detectors 52 and 52'.

Moreover, in the case of an output failure, the dual outputs from detectors 52 and 52' provide redundancy for increased reliability. Additionally, when both inputs are functioning, a wider search area is provided for a target, as illustrated in FIG. 3.

While several embodiments and variations of the present invention for a three dimensional binocular correlator are described in detail herein, it should be apparent that the disclosure add teachings of the present invention will suggest many alternative designs to those skilled in the art.

What is claimed is:

1. A three dimensional binocular optical correlator in which inputs provide additive/differential discrimination by combining optical inputs of left and right aspect angular views of a target onto one matched filter, comprising;
   a. at least one dual exposure matched filter which has recorded thereon holograms of left and right aspect angular views of a target with an overlapping target area therebetween, to allow better and more effective target discrimination and also to provide three dimensional information on the target;
   b. an optical correlator for directing left and right views of a target area superimposed on reference optical beams onto the dual exposure matched filter and for providing left and right correlation signals representative of the optical correlation outputs therefrom; and
   c. means for differentially monitoring the signal amplitudes of the left and right correlation signals to provide a control output signal.

2. A three dimensional binocular correlator as claimed in claim 1, said optical correlator including:
   a. left and right imaging optical systems for providing left and right images of left and right fields of view of a target area with an overlapping target area therebetween;
   b. left and right spatial light modulators positioned substantially in the focal planes of the left and right optical systems for superimposing the left and right fields of view onto reference optical beams;
   c. left and right optical transform systems for providing left and right optical transforms of the left and right fields of view superimposed on the reference beams in a common transform plane;
   d. said dual exposure matched filter being positioned in the common transform plane of said left and right optical transform systems; and
   e. left and right correlation detectors for detecting the left and right optical correlation outputs of said dual exposure matched filter.

3. A three dimensional binocular correlator as claimed in claim 2, further including a differential amplifier coupled to said left and right correlation detectors.

4. A three dimensional binocular correlator as claimed in claim 3, further including a correlation spot detector for detecting a common A+B correlation spot formed by said dual exposure matched filter.

5. An arrangement for fabricating a dual exposure matched filter by recording thereon left and right Fourier transform holograms of left and right angular views of a target, comprising:
   a. left and right imaging optical systems for providing left and right images of left and right fields of view of a target with an overlapping target area therebetween;
   b. left and right spatial light modulators positioned substantially in the focal planes of the left and right optical systems for superimposing the left and right fields of view onto reference optical beams;
   c. left and right optical transform systems for providing left and right transforms of the left and right fields of view superimposed on the reference beams in a common transform plane;
   d. a photo medium for forming the dual exposure matched filter positioned in the common transform plane of said left and right transform optical systems; and
   e. means for simultaneously illuminating said photomedium with a reference optical beam to form and record on the photomedium left and right Fourier transform holograms of the left and right angular views of the target.

* * * * *